US009776241B2

(12) United States Patent
Huang et al.

(10) Patent No.: US 9,776,241 B2
(45) Date of Patent: Oct. 3, 2017

(54) HIGH THERMAL CONDUCTIVITY DISK BRAKES

(76) Inventors: Xiaodi Huang, Houghton, MI (US); Xiaobin Song, Houghton, MI (US); Nannon R. Huang, Houghton, MI (US)

(*) Notice: Subject to any disclaimer, the term of this patent is extended or adjusted under 35 U.S.C. 154(b) by 1104 days.

(21) Appl. No.: 13/449,505

(22) Filed: Apr. 18, 2012

(65) Prior Publication Data

US 2013/0277157 A1    Oct. 24, 2013

(51) Int. Cl.
| | |
|---|---|
| B60T 1/06 | (2006.01) |
| B22D 19/00 | (2006.01) |
| B22D 19/04 | (2006.01) |
| F16D 51/52 | (2006.01) |
| F16D 65/09 | (2006.01) |
| F16D 69/04 | (2006.01) |

(52) U.S. Cl.
CPC ......... *B22D 19/0081* (2013.01); *B22D 19/04* (2013.01); *F16D 51/52* (2013.01); *F16D 65/09* (2013.01); *F16D 2069/0491* (2013.01); *F16D 2200/003* (2013.01); *F16D 2200/0013* (2013.01); *F16D 2250/0015* (2013.01)

(58) Field of Classification Search
CPC ..... B22D 19/0081; B22D 19/04; F16D 51/52; F16D 65/09; F16D 2069/0491; F16D 2200/0013; F16D 2200/003; F16D 2250/0015

See application file for complete search history.

(56) References Cited

U.S. PATENT DOCUMENTS

| | | | |
|---|---|---|---|
| 2,896,749 A * | 7/1959 | Gaylord | 188/264 R |
| 3,051,271 A * | 8/1962 | Spannagel et al. | 188/18 A |
| 4,023,613 A | 5/1977 | Uebayasi et al. | |
| 4,154,900 A | 5/1979 | Kaku et al. | |
| 4,576,875 A | 3/1986 | Olsson et al. | |
| 4,807,728 A | 2/1989 | Suenaga et al. | |
| 5,024,300 A * | 6/1991 | Miller et al. | 188/264 CC |
| 5,183,632 A | 2/1993 | Kiuchi et al. | |
| 5,190,091 A | 3/1993 | Revankar | |
| 5,207,776 A | 5/1993 | Pearce | |
| 5,224,572 A | 7/1993 | Smolen, Jr. et al. | |
| 5,620,042 A * | 4/1997 | Ihm | 164/95 |
| 5,862,892 A | 1/1999 | Conley | |
| 5,884,388 A | 3/1999 | Patrick et al. | |

(Continued)

FOREIGN PATENT DOCUMENTS

JP          9-042339 A       2/1997

*Primary Examiner* — Xuan Lan Nguyen
(74) *Attorney, Agent, or Firm* — Timothy E. Siegel Patent Law, PLLC; Timothy E. Siegel (57) ABSTRACT

An automotive disk brake assembly installed in an automobile having a wheel. The assembly includes a floating caliper supporting an inner and outer brake pad and a brake rotor having a disk, and a hat, and wherein the hat is bolted to the wheel. A hydraulic cylinder is adapted to push the inner brake pads into the disk surface, causing the floating caliper to move bringing the outer brake pad into contact with the disk. Finally, the rotor is made such that a complete 100 kilometer per hour, 0.9 gross vehicle weight braking causes the disk to expand in thickness by at least 0.15 mm and to cool to shrink in thickness, relative to its expanded thickness, by at least 0.1 mm within 60 seconds of the cessation of braking, in an ambient temperature of less than 30° C.

22 Claims, 5 Drawing Sheets

(56) References Cited

U.S. PATENT DOCUMENTS

| | | | |
|---|---|---|---|
| 6,098,764 A * | 8/2000 | Wirth et al. | 188/218 XL |
| 6,136,374 A | 10/2000 | Reuscher | |
| 6,216,826 B1 | 4/2001 | Botzet | |
| 6,321,885 B1 | 11/2001 | Wendt | |
| 6,357,557 B1 | 3/2002 | Di Ponio | |
| 6,427,754 B1 | 8/2002 | Ozcan | |
| 7,066,235 B2 | 6/2006 | Huang | |
| 2001/0045332 A1 | 11/2001 | Takahashi | |
| 2004/0178028 A1 | 9/2004 | Farmer et al. | |
| 2004/0195053 A1 * | 10/2004 | Nowak et al. | 188/72.4 |
| 2010/0084110 A1 * | 4/2010 | Strom | 164/498 |

* cited by examiner

HIGH THERMAL CONDUCTIVITY DISK BRAKES

BACKGROUND

Currently, most motor vehicles are equipped with disk brakes, in which a metal, carbon or ceramic disk is rigidly affixed to a car wheel. To cause braking, a pair of pads, one on either side of the disk, is pressed onto the surface of the disk, causing friction and slowing the vehicle. One challenge in the design of disk brakes is the need to absorb and dissipate the great amount of heat that is generated, as the kinetic energy of the vehicle is converted to heat energy by brake friction.

In currently available disk brakes systems, the heat of braking is absorbed by the material mass between the two rubbing surfaces of each disk. This heat is dissipated, as the disk spins, through a) air convection on the two rubbing surfaces, b) air convection in ventilation passageways cast into the disk, and c) heat radiation of the two rubbing surfaces, if the surfaces become red hot. A high surface temperature reduces a brake pad's life and friction coefficient dramatically, and is therefore highly undesirable.

Another problem encountered with disk brakes is that of incomplete outer brake pad disengagement after braking. Although the inner brake pad is affirmatively withdrawn a slight distance (0.15 mm), the outer brake pad tends to gently rub against the disk, after braking. This reduces fuel efficiency.

Also, as in any automotive component, the weight of a disk brake must be carried by the vehicle, so that any reduction in weight is desirable.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of an automotive disk brake assembly installed in an automobile having a wheel. The assembly includes a floating caliper supporting an inner and outer brake pad and a brake rotor having a disk, and a hat, and wherein the hat is bolted to the wheel. A hydraulic cylinder is adapted to push the inner brake pads into the disk surface, thereby causing the floating caliper to move so as to bring the outer brake pad into contact with the disk surfaces. Finally, the rotor is made at least in part of a material having a thickness and a coefficient of thermal expansion and a thermal conductivity, such that a complete 100 kilometer per hour, 0.9 gross vehicle weight braking causes the disk to expand in thickness by at least 0.15 mm and to cool to shrink in thickness, relative to its expanded thickness, by at least 0.1 mm within 60 seconds of the cessation of braking, in an ambient temperature of less than 30° C.

In a second separate aspect, the present invention may take the form of a disc brake rotor that includes a mounting hat and a solid disc, rigidly affixed to the mounting hat. The solid disk has a transverse dimension core, made of a first metal and two rubbing-surface claddings, set on either transverse side of the core, the claddings made of a second metal and having a thickness of 1-10 mm, and further defining physical engagement features. Also, a third metal is interposed between the first metal and the second metal, such that the second metal is bonded with the first metal metallurgically through the third metal and mechanically by the engagement features.

In a third separate aspect, the present invention may take the form of a method of fabricating a disk for a disk brake system. The method starts by the formation of a cladding workpiece having a first major external surface defining engagement features. Then the first major external surface is coated with a second metal. A mold is provided, defining an interior shape of a rotor and the cladding workpiece is inserted into the mold. A molten third metal is into the mold so that it engages to the engagement features and reacts with the second metal and is permitted to cool, thereby forming a disk made of the third metal, which is metallurgically bonded and mechanically interlocked to the cladding workpiece.

In a fourth separate aspect, the present invention may take the form of a disk braking system having a rotor that has a conductance of greater than 2 Watts/° C.

In a fifth separate aspect, the present invention may take the form of a disk braking system having a rotor hat that has a conductance of greater than 4 Watts/° C.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

FIG. 2a shows a detail view of a portion of FIG. 2, indicated by circle 2a.

DETAILED DESCRIPTION OF THE PREFERRED EMBODIMENTS

Definition: In this application the term "inward" means toward the longitudinal center line of a vehicle in which the brake assembly is installed or into which it will be installed, and "outward" means away from this centerline.

Figure 1:
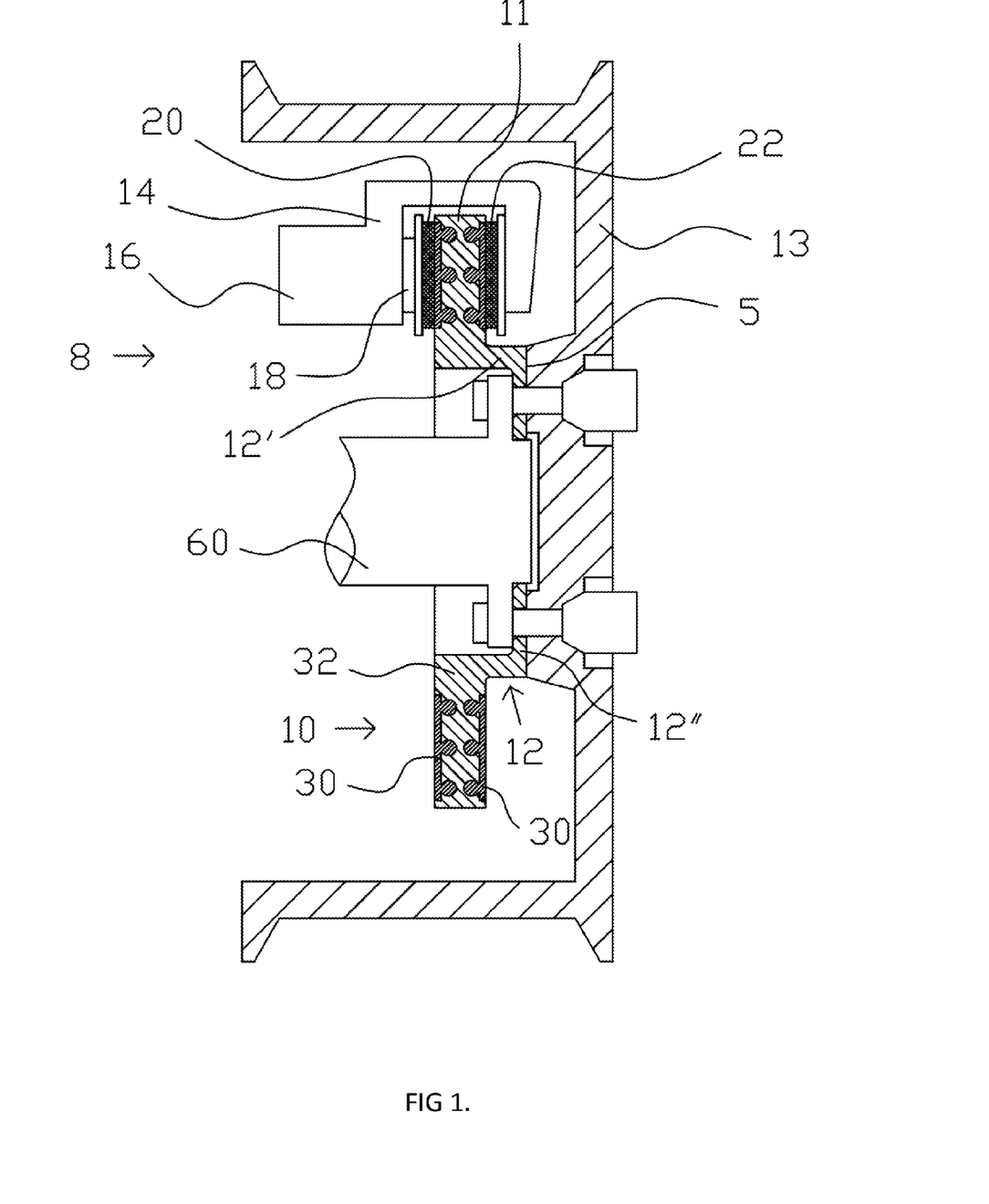
FIG. 1 shows a cross-sectional view of a disk braking assembly having a disk attached to an automobile wheel.
Figure 4:
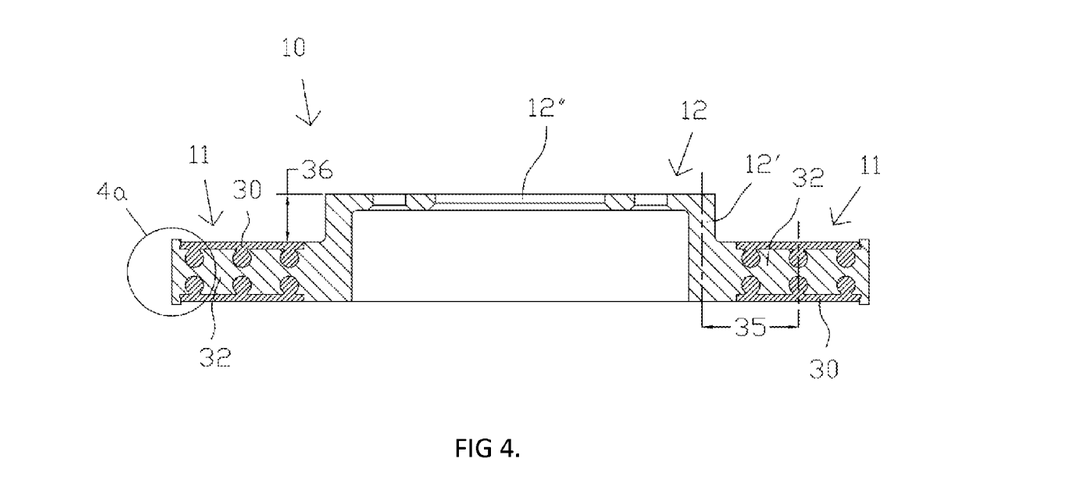
FIG. 4 shows a cross-sectional view of the rotor of the assembly of FIG. 1.

Referring to FIGS. 1 and 4, a brake assembly 8, includes a brake rotor 10, which includes a disk 11 and a mounting hat 12, made up of a mounting hat side wall 12' and a mounting hat top wall 12" (see FIG. 4) mounted on a vehicle wheel 13.

A floating caliper 14, defines a hydraulic cylinder 16 into which a piston 18 is set. An inner brake pad 20 is mounted on piston 18, such that when piston 18 is pushed outwardly from cylinder 16, inner brake pad 20 contacts disk 11. This in turn causes caliper 14 to be pulled inwardly so that an outer brake pad 22, held by caliper 14 contacts disk 11.

In currently available brake assemblies, when braking is no longer applied, the inner brake pad 20 retracts slightly, but the outer brake pad 22 does not necessarily retract adequately, and may continue to contact the rotor, causing a drag on movement and reducing fuel efficiency. In brake assembly 8, however, rotor 10 is made in part of a metal that has a high coefficient of thermal expansion and a high thermal conductivity, so that disk 11 expands during braking. Heat is then quickly conducted away by hat 12 into wheel 13, so that disk 11 shrinks when braking is no longer applied. As a result, outer brake pad 22 is not positioned as far inward as it would be if not for the disk 11 expansion, and when disk 11 contracts, it withdraws from contact of outer brake pad 22, thereby avoiding the problems caused by this contact. The other alternative in addressing the problem of the outer pad 22 not retracting sufficiently after braking would be to enlarge the spread of the caliper 14, thereby spreading the pads 20 and 22 apart. This, however, worsens the brake pedal response, forcing the driver to press the brake pedal down farther before braking begins. The slightly slower braking response would add to the number of automobile accidents occurring every year.

Many aluminum alloys have the thermal properties required to effectuate the present invention. These are a high coefficient of thermal expansion and high thermal conductivity (such as A308, A355, A356, A357, A443, A514, A850, and pure aluminum). Unfortunately, however, aluminum alloys are typically too soft to use in a brake rotor. In a preferred embodiment this problem is addressed by providing a steel cladding 30 affirmatively attached to a second metal disk core 32. The rotor 10 is connected to a wheel 13 made of a material with high thermal conductivity and high specific heat such as an aluminum alloy. In order to maximize the flow of heat through and out of rotor 10, it is solid (as opposed to vented) and the thickness of the mounting hat side wall 12' is greater than 0.024 of disk 11 diameter, preferably much greater if the brake assembly space allows, the mounting hat height should be lower, preferably less than 5 cm for a front disk brake, or less than 8 times of the thickness of the mounting hat side wall, the mounting hat outer diameter is greater than 0.5 of disk 11 outer diameter, and the diameter of the contact area 5 between the mounting hat 12 and the wheel 13 is preferably equal to the mounting hat outer diameter. If not, a thermal coupler can be designed, fabricated and installed to increase the contact area, therefore, the heat transfer from the mounting hat to the wheel. A thermal conductive paste can be applied between the mounting hat and the wheel contact to further improve heat transfer.

Equation (1) describes the theoretical temperature increase in ° C., of a front disk brake (which generates the bulk of the heat in an automobile, relative to the rear brakes).

$$T_{th} = \frac{(1-\phi)}{2}\left[\frac{w(v_1^2 - v_2^2)}{2g(\rho_r c_r v_r + \rho_c c_c v_c)}\right] \quad (1)$$

Where $T_{th}$=theoretical temperature increase, ° C.
  $\phi$=the percentage rear braking
  W=vehicle weight, kg
  $V_1$=initial velocity, m/s
  $V_2$=final velocity, m/s
  g=gravitational constant, 9.8 m/s$^2$
  $\rho_r$=rotor body material density, kg/m$^3$ $c_r$=rotor body material specific heat capacity, J/kg° C.
$v_r$=rotor body material volume, m$^3$
$\rho_c$=clad material density, kg/m$^3$
$c_c$=clad material specific heat capacity, J/kg° C.
$v_c$=clad material volume, m$^3$ In addition, we can define the following two quantities, the conductance of the rotor (Conductance$_{rotor}$) and the conductance of the hat (Conductance$_{hat}$), using the parameters defined for the.

$$\text{Conductance}_{rotor} = \frac{k_r A_{cross}}{H_{hat} + Th_{1/2d} + D_{d-h}}$$

One braking system design goal is to limit the theoretical temperature increase to less than 230° C. after a complete stop from 100 kph. The use of a brake body material with high specific heat and a solid disk brake help to meet this goal. Aluminum and its alloys are good candidate materials for this application.

The calculation for heat dissipation from a traditional vented disk brake is based on the sum of convective cooling of rubbing surfaces, convective cooling of ventilation surfaces, and radiative cooling of rubbing surfaces. The disk brake disclosed in this application is of a solid type, and has the same convective cooling and radiative cooling of rubbing surfaces, but replaces the convective cooling of ventilation surfaces (Eq. 2) with conductive cooling to a connected metal wheel (Eq. 3).

$$q_{vent} = h_{vent} A_{vent}(T_r - T_\infty) \quad (2)$$

Where $q_{vent}$=heat dissipation by convection at ventilation surfaces, Joules/hour
  $h_{vent}$=heat transfer coefficient of convection at ventilation surfaces, Joules/(hour*m$^2$*° C.)
  $A_{vent}$=ventilation surface area, m$^2$
  $T_r$=rotor body temperature, ° C.
  $T_\infty$=ambient temperature, ° C.
  h=hours $$q_{cond} = k_r A_{cross}(T_r - T_{wh-C})/(H_{hat} + Th_{1/2d} + D_{d-h}) \quad (3)$$

Where $q_{cond}$=heat dissipation by conduction to metal wheel, J/h
  $k_r$=rotor body thermal conductivity, J/(h m° C.)
  $A_{cross}$=cross section area of rotor mounting hat side wall, m$^2$
  $T_r$=rotor body temperature, ° C.
  $T_{wh-C}$=wheel temperature at the contact surface with rotor, ° C.
  $H_{hat}$=height of rotor mounting hat, m (reference number 36 is FIG. 4)
  $Th_{1/2d}$=half thickness of rotor disk, m
  $D_{d-h}$=the distance between the disk middle circle and the mounting hat middle circle (FIG. 4.), m (reference number 34 in FIG. 2.)

In addition, we can define the following two quantities, the conductance of the rotor (Conductance$_{rotor}$) and the conductance of the hat (Conductance$_{hat}$), using the parameters defined for the heat dissipation equation, above:

$$\text{Conductance}_{rotor} = \frac{k_r A_{cross}}{H_{hat} + Th_{1/2d} + D_{d-h}} \text{Watts/° C.} \quad (4)$$

$$\text{Conductance}_{hat} = \frac{k_r A_{cross}}{H_{hat}} \text{Watts/° C.} \quad (5)$$

In a preferred embodiment, a disk braking system has a rotor that has a conductance of greater than 4 W/° C. when used for stopping a movement with a maximum (270 kJ) kinetic energy loaded on the brake system. For stopping a movement with higher kinetic energy, the conductance should be increased proportionally.

Also, in a preferred embodiment, a disk braking system has a rotor hat that has a conductance of greater than 8 W/° C. when used for conducting a maximum heat converted from 270 kJ kinetic energy at once from the rotor disk to a contacted wheel. For conducting a greater heat flow, the conductance should be increased proportionally.

EXAMPLE

A 2002 Dodge Neon passenger car has 1,542 kg or 15,129 Newton GVWR, 70% braking on front brakes, 85% heat distribution onto rotor, 15% onto pads, 8% tire slip. The car decelerates from a speed of 128.7 km/h or 35.76 m/s without brake lockup. The entire vehicle braking energy is $$E_b = \frac{(15,129)(35.76)^2}{2(9.81)} = 986,067 \text{ Nm} = 0.274 \text{ kWH}$$

The converted braking heat absorbed by one front brake is $E_{b\text{-}fr}=(0.274)(1-0.08)(0.70)(0.5)(0.85)=0.075$ kWh=270 kJ The Dodge Neon disc brake has an aluminum body with $k_r$=166 W/(m° C.), a mounting hat with wall cross section 29.35 cm², hat height 3.81 cm, disc thickness 2.03 cm, and $D_{d\text{-}h}$ 1.78 cm. Its rotor conductance and hat conductance are 0.00639 kW/° C. and 0.0128 kW/° C. respectively.

The heat stored in the connected wheel is then dissipated by convective cooling of outer wheel surfaces.

$$q_{wh}=h_{wh}A_{wh}(T_{wh\text{-}A}-T_\infty) \quad (6)$$

Where $q_{wh}$=heat dissipation by convection of wheel surfaces, Joules/hour
  $h_{wh}$=heat transfer coefficient of convection at wheel outer surfaces, Joules/(hour*m²*° C.)
  $A_{wh}$=wheel outer surface area, m²
  $T_{wh\text{-}A}$=average wheel temperature, ° C.

Proper design of disk brake and wheel shapes and dimensions and proper selection of materials can make the conductive cooling of the present invention, $q_{cond}$ and $q_{wh}$, much greater than $q_{vent}$, for a traditional vented disk brake. This results in the wheel acting as the main heat sink and radiator, and lower brake working temperatures, up to several hundred degrees lower than temperatures reached at identical braking conditions by conventional cast iron disk brakes. Lower working temperatures reduce the pad wear considerably. All passenger cars, except for very small ones, use vented disk brakes for their front brake applications because they can take heavier duty. Unfortunately, the vents of the vented disk brakes of cast iron rust readily and get air blocked quickly, causing their heat dissipation capabilities to decline dramatically after a moderate period of use. The preferred embodiment described above makes nonferrous metal based and solid (not vented) disk brake suitable for front brake applications of most passenger cars. This preferred embodiment of disk brake does not rely on vents, which have proven so problematic, for heat dissipation and does not rust readily, resulting in consistent and excellent capability of heat dissipation during its entire life. The invented disk brake is also suitable for rear brake applications. The parking brake shoes, which contact the rear brakes on the interior surface of the hat side wall, can be made of softer material, as they are contacting an aluminum alloy, which is softer than the cast iron that similar pads contact in currently available rear disk brakes.

In one preferred embodiment, the disk brake and wheel assembly can absorb and dissipate heat during repeated 100 kph (kilometer per hour) 0.9 GVWR (deceleration of gross vehicle weight rating with 0.9 gravitational constant) braking without exceeding 480° C. GVWR is the weight that a vehicle is designed to carry. The GVWR includes the net weight of the vehicle, the weight of passengers, fuel, cargo, and additional accessories.

EXAMPLE

A brake rotor's performance is evaluated quantitatively using a brake dynamometer. It can simulate precisely the brake working conditions and obtain the brake's response as in a real vehicle, such as GVWR, vehicle weight center, wheel rolling radius, static and dynamic wheel loads, wheel inertia, vehicle speed, deceleration speed, stop distance, pressure on brake pad, friction coefficient, and rubbing surface temperatures of inboard pad, outboard pad and rotor before and after a stop. Brake fade test is a standard test procedure to evaluate the temperature performance of a brake rotor and pads by 15 continuous stops at GVWR, 120 kph speed, 0.3 g deceleration, and 45 second stop intervals.

A SCA solid brake rotor for the 2002 Dodge Neon front brake used with an aluminum wheel mounted together has been tested on a brake dynamometer by a commercial brake testing lab following the FMVSS-135 certification test procedure. The fade test included in the FMVSS-135 certification test shows that the final temperature of the rotor rubbing surface is 365° C. and 150° C. lower than the final pad temperature immediately after the 15th stop. In contrary, the final rotor temperature of the corresponding cast iron vented rotor is 569° C. and 144° C. higher than the final pad temperature with the identical testing conditions. It shows that the SCA brake rotor surface temperature is 204° C. cooler than the corresponding cast iron brake rotor surface temperature under identical fade test conditions. The corresponding cast iron brake rotor means identical outer dimensions in comparison with the SCA brake rotor.

Fabrication

Figure 2:
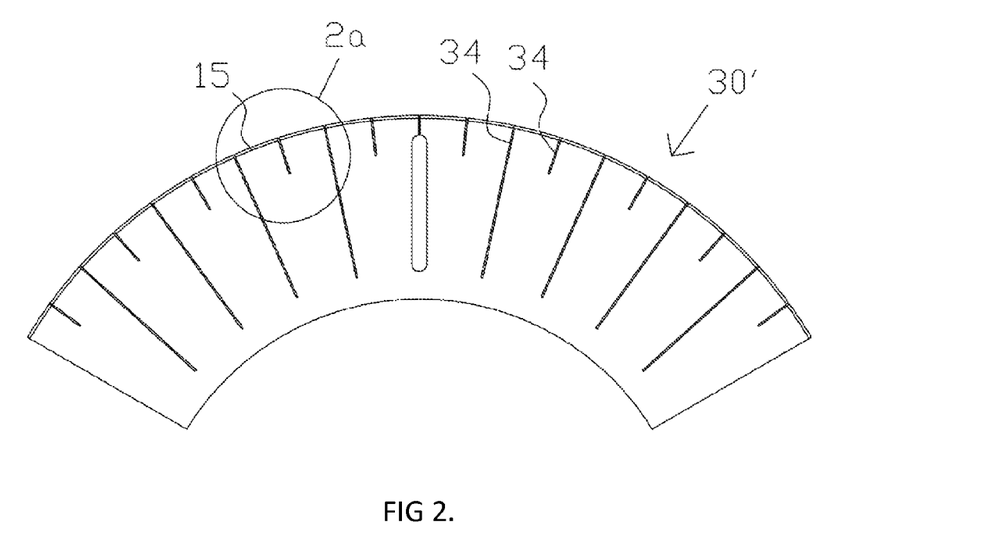
FIG. 2 shows a plan view of a cladding workpiece that is incorporated into the assembly of FIG. 1.
Figure 2A:
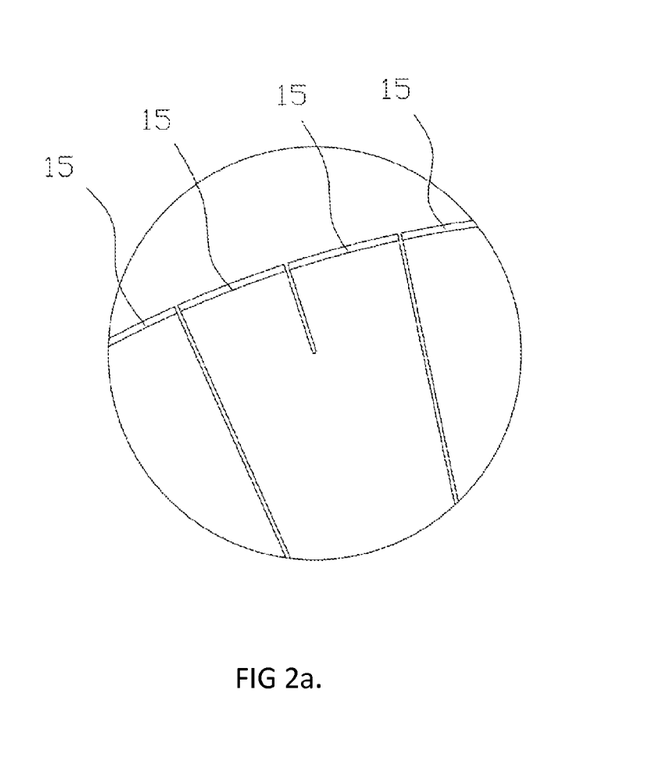
Figure 4A:
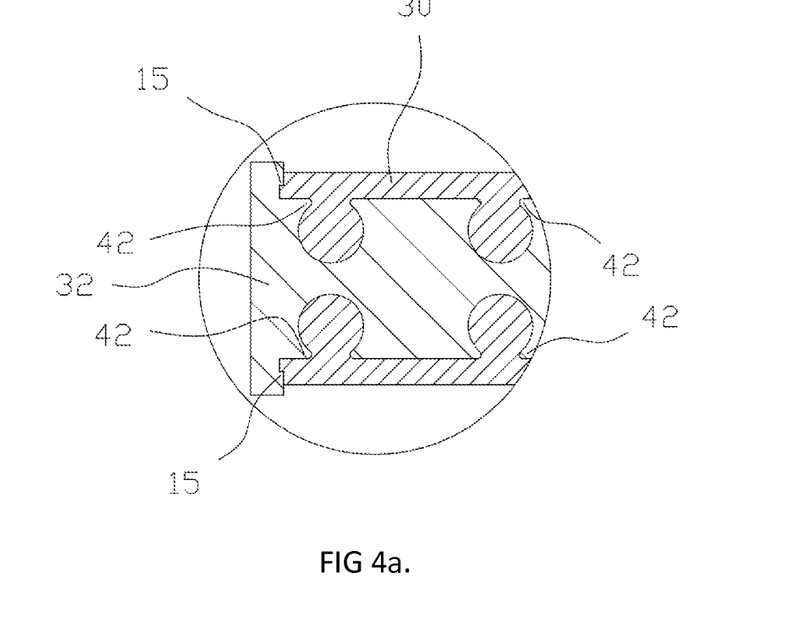
FIG. 4a shows a detail view of the rotor of FIG. 4, as indicated by circle 4a of FIG. 4.

Referring to FIG. 2, FIG. 2a and FIG. 4a, in a preferred embodiment, rotor 10 is manufactured by producing three steel cladding work pieces 30', each in the shape of a 118° arc, and forming a set of through cuts 34 and step cuts 15.

A binder, preferably organic, such as rosin, gum, glue, oil, dextrin, acrylic, cellulose, syrup, phenolic, or polyurethane, is applied to a portion of said preliminary cladding work piece 30' evenly or in a predetermined pattern. As an alternative embodiment, the binder is blended with additives. These additives may consist of metal, metal oxide and/or carbon particles in the size range from 0.1-500 μm, preferably 1-147 μm, in the binder and additive weight ratio preferably 1:2 to 1:10.

Metal beads 40 (FIG. 3), which may be of either regular or irregular shapes, adhere on the binder-applied surface 41 of the preliminary cladding work piece 30' (FIG. 2). The regular or irregular shapes may include spherical, cylindrical, polyhedral, ellipsoidal, T-shape, I-shape, L-shape, V-shape, screw, cone, staple, and other shapes which can generate mechanical interlocking. Equal-size metal spheres of 2-20 mm in diameter or 3.14-314 mm² in cross-section are used in one preferred embodiment. These metal beads 40 adhere on the binder-bearing surface 41 in a predetermined distribution pattern in conjunction with the said slot 34 (FIG. 2) pattern to arrange the slots 34 (FIG. 2) between beads to reduce thermal stress between beads during fabrication and service.

Figure 3:
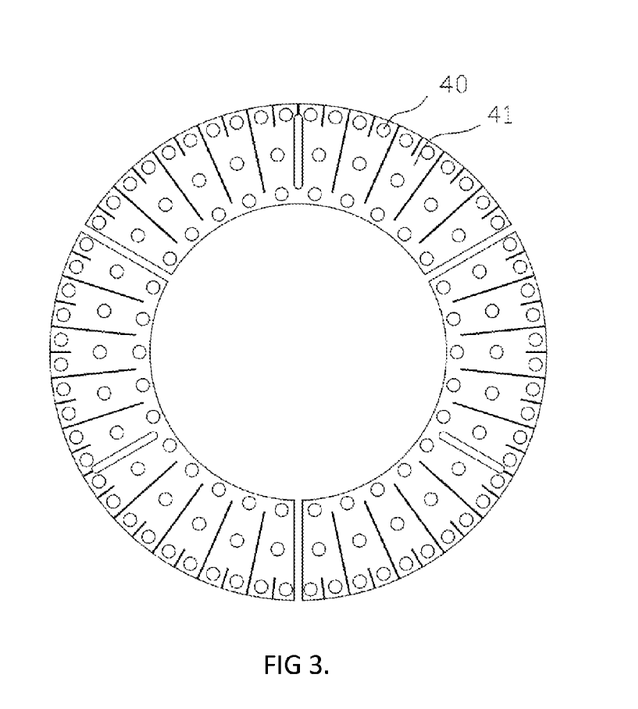
FIG. 3 shows a plan view of three of the cladding workpieces of FIG. 2, shown arranged as in the disk, and oriented so that the side facing into the disk is shown.

Alternatively, binder may be applied to the beads 40, rather than, or in addition to, the cladding workpiece 30'. The distance between beads is preferably 1.5-10 times of said bead's diameter.

The workpiece 30', now including the binder and the beads 40, is loaded into a furnace. At an elevated temperature, the metal oxide reduces by carbon if metal oxide powder is used, the binder and possibly a portion of the beads 40 and the surface material of cladding workpiece 30', form a transient metal liquid. The transient metal liquid forms necks 42 (FIG. 4*a*) on the beads 40. Due to atomic diffusion of elements in the metal necks to adjacent regions, the metal necks become solid at said elevated temperature. The cross-sectional diameter of a metal neck 42 is smaller than the bead's diameter, preferably ⅓-⅔ of the bead's diameter. After cooling, the beads 40 are welded onto the preliminary cladding workpiece 30' through the metal necks 42. As an alternative embodiment, the binder itself forms metal liquid and builds metal necks at an elevated temperature. The metal necks become solid after cooling.

The cladding workpiece can be further shaped by bending, straightening, punching, drawing or welding. The metal beads 40 can be deformed by pressing to form them into shapes better adapted for mechanical interlocking. The workpiece 30, is coated with a second metal which can form metallurgical bonding or interface compounds with both steel and a third metal. The second metal can be selected from Cu, Zn, Ni, Cr, Al, Fe, Si, Mn, Mg, Ti and their alloys. The workpiece is coated partially or entirely by chemical vapor deposition, physical vapor deposition, thermal spray coating, plating, spraying, brushing, or dipping.

The cladding workpiece is then inserted into a sand or metal mold. The third metal 32 (FIG. 1), preferably an aluminum alloy, is melted and cast into this mold to form a solid disk brake with the cladding workpiece 30'. Any metal casting methods commonly used by the metal casting industry, such as green sand casting, die casting, squeeze casting, permanent mold casting, coremaking and inserting, investment casting, lost foam casting, and others, can be used in this invention. During casting, the molten third metal 32 is poured into the mold so that it flows about and covers the beads and reacts with the second metal and permits the molten third metal 32 to cool. The first metal surface, including the surface of the beads 40 and the necks 42, the cladding workpiece 30', and the step cut 15 surface bonds with the third metal body 32 in the combination of metallurgical bonding and mechanical interlocking, such as the third metal catches both the necks 42 of beads 40 and the step cuts 15. The resulting disk brake is heat-treated to release residual stress, machined to produce the final product with the required dimensions and enhanced properties on the rubbing surfaces, and painted with a high temperature paint in part to prevent salt corrosion.

Figure 5:
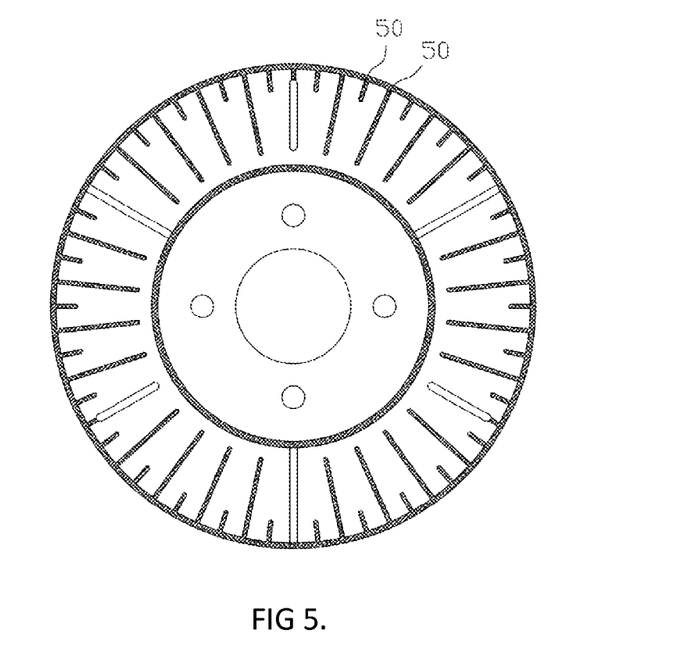
FIG. 5 shows a plan view of an alternative embodiment of the rotor of FIG. 4.

Referring to FIG. 5, in an alternative preferred embodiment, wider cladding slots 50 are cut to allow molten third metal 32 (FIGS. 1, 4*a*, and 4) into the slots 50 during casting. After machining, the rubbing surfaces present a steel and aluminum hybrid structure as shown in FIG. 5. If carbon-kevlar pads are used such, the friction coefficient can be further increased to shorten stop distance.

Figure 6:
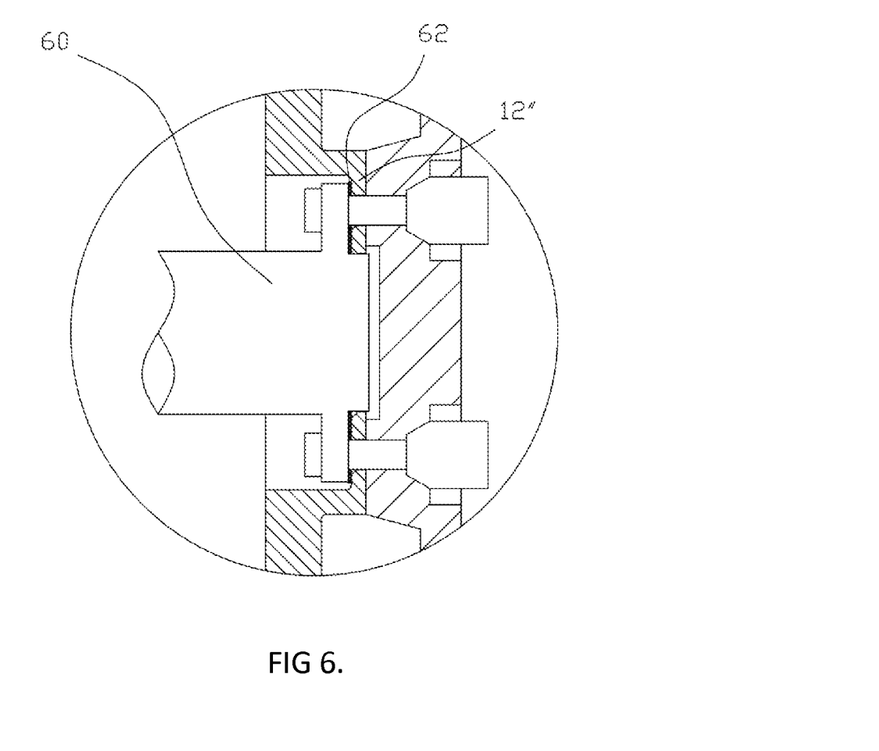
FIG. 6 shows a cross-sectional view of the wheel-disk-axle junction of an alternative embodiment of the assembly of FIG. 1.

Referring to FIG. 6, in a preferred embodiment, the inwardly facing surface of hat top wall 12" is thermally and sonically separated from the bearing hub 60 by a thin gasket 62, preferably made of poly tetrafluoroethylene. Gasket 62 also prevents the rotor 10 from sticking to the bearing hub 60 by way of a rust buildup. As another alternative to using a gasket 62, poly tetrafluoroethylene can be coated on the hat top wall 12" inwardly facing surface.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. An automotive disk brake assembly installed in an automobile having a wheel, comprising:
    (a) a floating caliper supporting an inner and outer brake pad;
    (b) a brake rotor having a disk, and a hat, and wherein said hat is bolted to said wheel, said disk further having an inner disk surface and an outer disk surface;
    (c) a hydraulic cylinder adapted to push said inner brake pads into said inner disk surface, thereby causing said floating caliper to move so as to bring said outer brake pad into contact with said outer disk surface;
    (d) wherein said rotor is made at least in part of a material having a thickness and a coefficient of thermal expansion and a thermal conductivity, such that a complete 100 kilometer per hour, 0.9 gross vehicle weight braking causes said disk to expand in thickness by at least 0.15 mm and to cool to shrink in thickness, relative to its expanded thickness, by at least 0.1 mm within 60 seconds of the cessation of braking, in an ambient temperature of less than 30° C.

2. The disk brake assembly of claim 1, wherein said material has a coefficient of thermal expansion of greater than $10.44 \times 10^{-6}/°$ C.

3. The disk brake assembly of claim 1, wherein said material has a coefficient of thermal expansion of greater than $19.8 \times 10^{-6}/°$ C.

4. The disk brake assembly of claim 1, wherein said disk is clad in steel at surface area contacted by said pads.

5. The disk brake assembly of claim 1, wherein said assembly is mounted in an automobile having bearing hubs and wherein said hat is set about one of said bearing hubs and wherein a gasket thermally separates said bearing hub from said hat.

6. The disk brake assembly of claim 5, wherein said gasket is made of poly tetrafluoroethylene.

7. The disk brake assembly of claim 1, further comprising a thermal coupler positioned between said hat and said wheel, to increase heat transfer from said hat to said wheel.

8. The disk brake assembly of claim 1, further comprising a thermal conductive paste placed between said hat and said wheel contact to increase heat transfer.

9. A disc brake rotor, comprising:
    (a) mounting hat; and
    (b) solid disc, rigidly affixed to said mounting hat, and including:
        i. a transverse dimension core, made of a first metal;
        ii. two rubbing-surface claddings, set on either transverse side of said core, said claddings made of a second metal and having a thickness of 1-10 mm, and further defining physical engagement features;
        iii. a third metal interposed between said first metal and said second metal; and iv. wherein said second metal bonded with said first metal metallurgically through said third metal and mechanically by said engagement features; and (c) wherein said rotor has a conductance of greater than 4 Watts/° C.

10. The disk brake rotor of claim 9, wherein said engagement features include step cuts formed in said claddings, and filled with said first metal.

11. The disk brake rotor of claim 9, wherein said engagement features further include radially-oriented through slots in said claddings, into which said first metal has intruded, said radially-oriented through slots being adapted to ameliorate the effects of thermal expansion of said cladding workpiece.

12. The disk brake rotor of claim 11, wherein said engagement features include beads arranged substantially medially between said through slots.

13. The disc brake rotor of claim 9, wherein although said first metal and said second metal expand by more than 0.1% during braking, there is no detrimental effect of residual stress on said first metal and said second metal.

14. A disk brake system having a rotor that has a conductance of greater than 2 Watts/° C.

15. The system of claim 14, having a rotor that has a conductance of greater than 3 Watts/° C.

16. The system of claim 14, having a rotor that has a conductance of greater than 4 Watts/° C.

17. The disk brake system of claim 14 wherein said rotor includes a mounting hat that has a side wall, and wherein said side wall has a thickness of greater than 0.024 times the diameter of said rotor.

18. The disk brake system of claim 14, wherein said rotor includes a mounting hat that has a height and also has a side wall, having a thickness, and wherein said height of said mounting hat is less than 8 times said thickness of said side wall.

19. A disk brake system having a rotor hat that has a conductance of greater than 4 Watts/° C.

20. The system of claim 19, having a rotor hat that has a conductance of greater than 6 Watts/° C.

21. The system of claim 19, having a rotor hat that has a conductance of greater than 8 Watts/° C.

22. The disk brake system of claim 19, wherein said rotor hat has a height and also has a side wall, having a thickness, and wherein said height of said mounting hat is less than 8 times said thickness of said side wall.

* * * * *